US008988714B2

(12) United States Patent
Harada

(10) Patent No.: US 8,988,714 B2
(45) Date of Patent: Mar. 24, 2015

(54) PRINTER SYSTEM AND PRINTER

(71) Applicant: Noriaki Harada, Shizuoka-ken (JP)

(72) Inventor: Noriaki Harada, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/716,718

(22) Filed: Dec. 17, 2012

(65) Prior Publication Data

US 2013/0229682 A1    Sep. 5, 2013

(30) Foreign Application Priority Data

Mar. 2, 2012   (JP) ................................. 2012-046753

(51) Int. Cl.
G06F 15/00        (2006.01)
G06F 3/12         (2006.01)

(52) U.S. Cl.
CPC ............ *G06F 3/1296* (2013.01); *G06F 3/1215* (2013.01); *G06F 3/1259* (2013.01); *G06F 3/1285* (2013.01)
USPC ....................................................... 358/1.15

(58) Field of Classification Search
USPC ....................................................... 358/1.15
See application file for complete search history.

(56) References Cited

U.S. PATENT DOCUMENTS 8,659,788 B2 *     2/2014   Watanabe et al. ............... 358/1.2
2011/0176165 A1 *  7/2011   Shiba et al. ................... 358/1.15

FOREIGN PATENT DOCUMENTS

| JP | 61-015228  | 1/1986  |
| JP | 62-121529  | 6/1987  |
| JP | 02-190372  | 7/1990  |
| JP | 09-314960  | 12/1997 |

OTHER PUBLICATIONS

Japanese Office Action for Japanese Application No. 2012-046753 dated Jan. 28, 2014 corresponding to U.S. Appl. No. 13/716,718, filed on Dec. 17, 2012.

* cited by examiner

*Primary Examiner* — Saeid Ebrahimi Dehkordy
(74) *Attorney, Agent, or Firm* — Amin, Turocy & Watson, LLP

(57) ABSTRACT

A printer system includes a host computer which transmits printing data; and a printer which receives and prints the printing data transmitted from the host computer, wherein second printing data following after first printing data is transmitted from the host computer to the printer before a predetermined time at which printing of the first printing data in the printer ends.

10 Claims, 3 Drawing Sheets

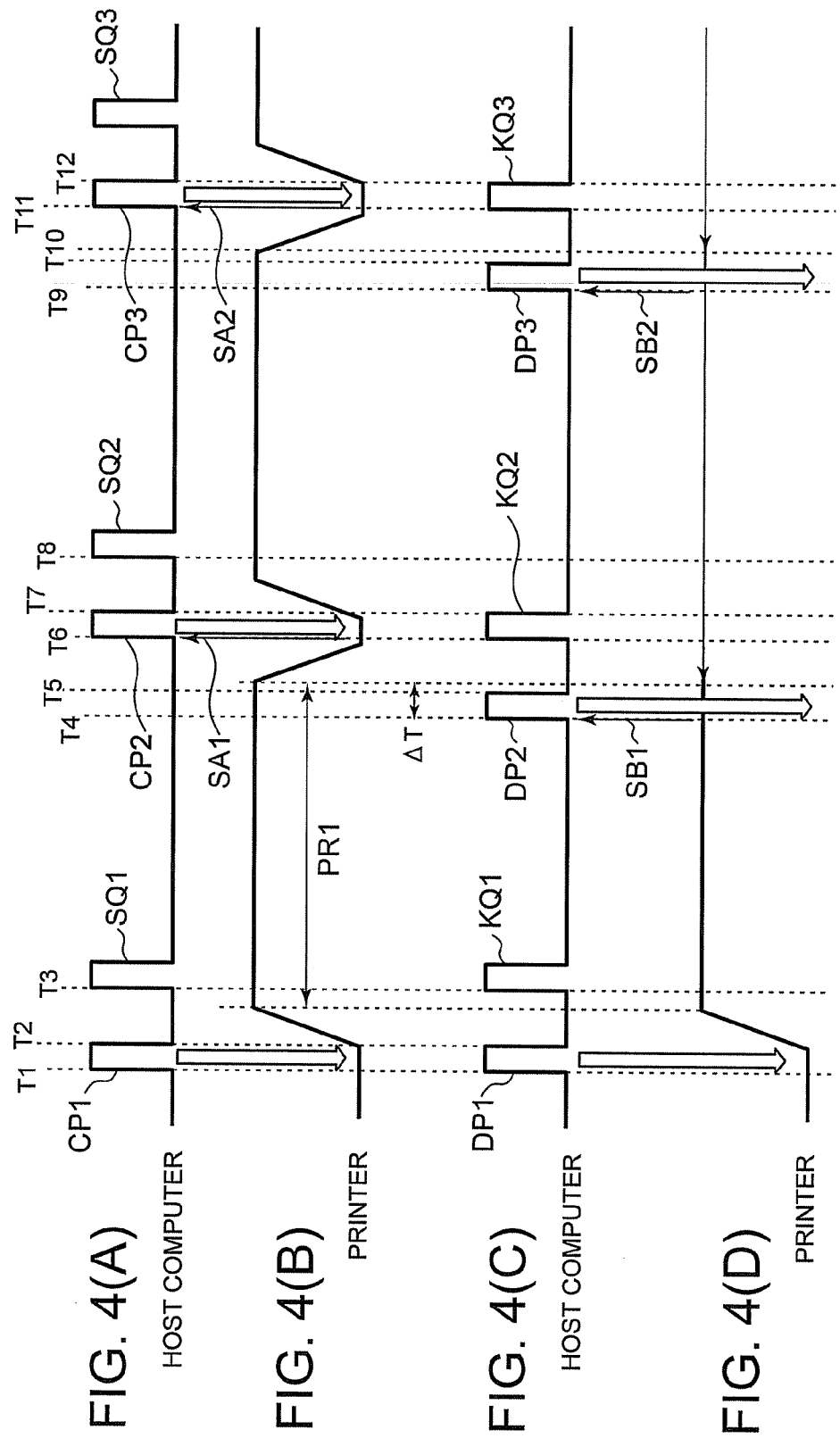

PRINTER SYSTEM AND PRINTER

CROSS-REFERENCE TO RELATED APPLICATION

This application is based upon and claims the benefit of priority from the prior Japanese Patent Application No. 2012-046753, filed on Mar. 2, 2012, the entire contents of which are incorporated herein by reference.

FIELD

Embodiments relate to a printer system and a printer that receive printing data from a host computer and print the printing data.

BACKGROUND

A printer is known which receives printing data together with a state inquiry signal from a host computer and returns a state response signal representing a printing end state to the host computer after performing a printing process. This kind of printer prints the printing data received from the host computer and transmits the response signal representing the printing end state to the host computer. Since the host computer checks the response signal and then transmits printing data for the next row, there is a time interval between the printing for the previous row and the printing for the next row. As a result, there is a problem in that the printing process may not be continuously performed and may not be efficiently performed as a whole.

Furthermore, a method is known which controls a line printer including a printer control unit for pre-fetching a command from an upper-level apparatus and notifying a paper-out condition to the upper-level apparatus when detecting a state where the paper almost runs out. However, this method merely notifies the paper-out condition to the upper-level apparatus before the paper runs out.

BRIEF DESCRIPTION OF THE DRAWINGS

FIGS. 4A to 4D are diagrams illustrating a timing comparison between the embodiment and the related art.

DETAILED DESCRIPTION OF EMBODIMENTS

An embodiment provides a printer system including: a host computer which transmits printing data; and a printer which receives and prints the printing data transmitted from the host computer, wherein second printing data following after first printing data is transmitted from the host computer to the printer before a predetermined time at which the printing of the first printing data in the printer ends.

According to the embodiments, a printer system and a printer capable of continuously performing a printing process without stopping the printing process can be provided.

Figure 1:
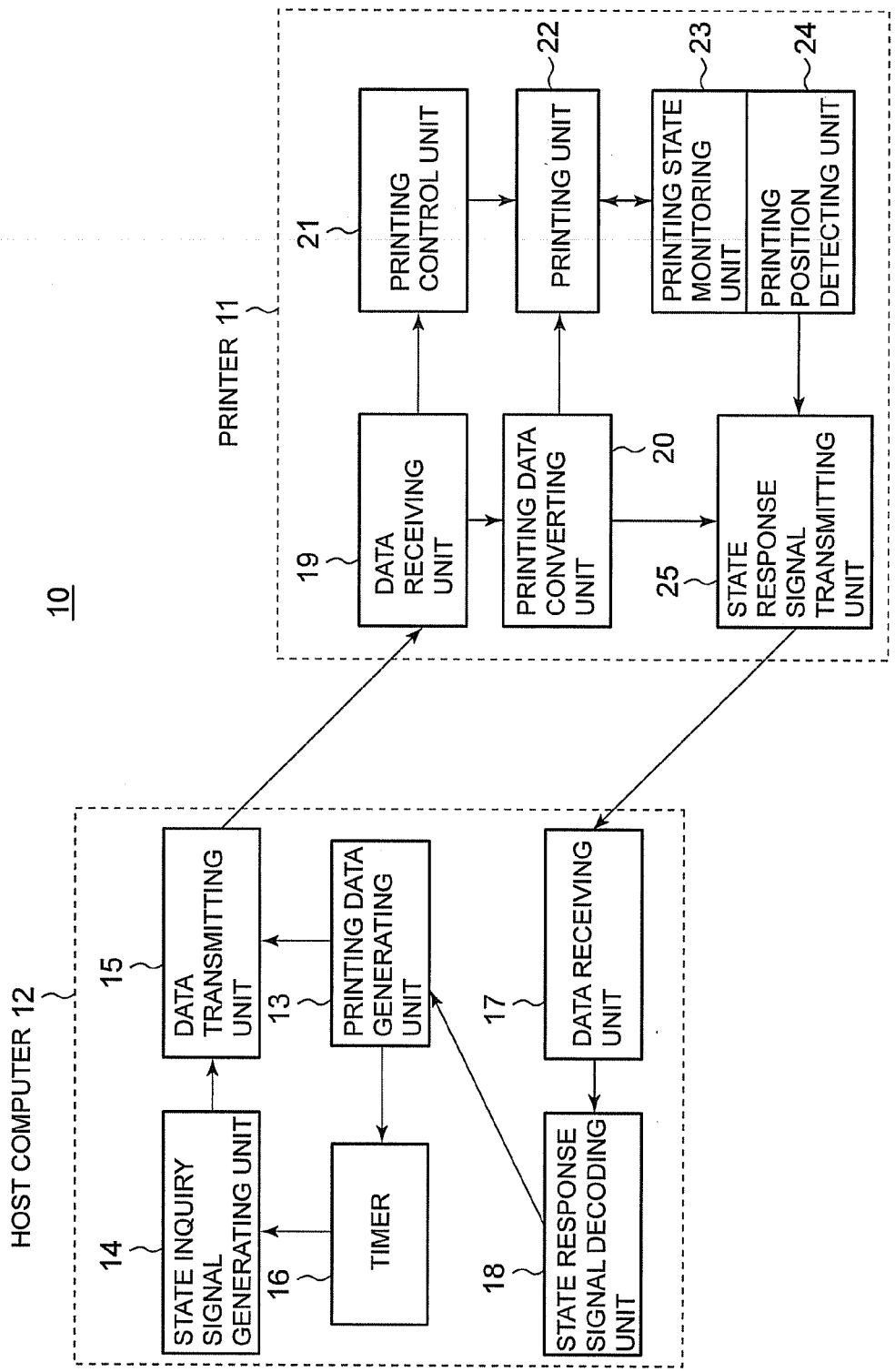
FIG. 1 is a diagram illustrating a configuration of a printer system of an embodiment.

Hereinafter, an embodiment will be described by referring to the drawings. A configuration example of an embodiment of a printer system is illustrated in FIG. 1.

A printer system 10 includes a printer 11 and a host computer 12 which is positioned at the level higher than the printer 11 and transmits printing data to the printer 11.

The host computer 12 includes a printing data generating unit 13 which generates printing data to be printed by the printer 11, a state inquiry signal generating unit 14 which generates a state inquiry signal inquiring a state of the printer 11, a data transmitting unit 15 which transmits the state inquiry signal generated by the state inquiry signal generating unit 14 and the printing data generated by the printing data generating unit 13, a timer 16 which measures a time after transmitting the printing data generated by the printing data generating unit 13 to the data transmitting unit 15 and transmits a control signal to the state inquiry signal generating unit 14 when a predetermined time elapses, a data receiving unit 17 which receives a state response signal and the like from the printer 11, and a state response signal decoding unit 18 which decodes the state response signal. Furthermore, the printing data generating unit 13 may generate and store the printing data at one time, or may generate the printing data every time.

On the other hand, the printer 11 includes a data receiving unit 19 which receives the printing data and the state inquiry signal transmitted from the data transmitting unit 15 of the host computer 12, a printing data converting unit 20 which converts printing data (character data) received by the data receiving unit 19 into line data, a printing control unit 21 which receives a printing control signal from the data received by the data receiving unit 19 and performs a printing control, a printing unit 22 which prints the line data converted by the printing data converting unit 20 under the control of the printing control unit 21, a printing state monitoring unit 23 which monitors a printing state in the printing unit 22, a printing position detecting unit 24 which detects whether the printing is performed up to a predetermined position in the printing unit 22, and a state response signal transmitting unit 25 which transmits the result, in which the printing is performed up to a predetermined position, detected by the printing position detecting unit 24 as a state response signal to the host computer 12.

Figure 3:
FIG. 3 is a diagram illustrating a relation between printing data and line data.

The printing data which is received by the data receiving unit 19 is data (character data) obtained by a character code and is, for example, data of character such as AAA indicated by 31a, 31b, and 31c of FIG. 3.

The character data is converted into the line data (the printing data) indicated by the reference numerals 32a, 32b, and 32c of FIG. 3 in the printing data converting unit 20. In the printing unit 22, the line data is printed for each line, and the printing for one row includes printing of several lines. In a state where the printing for one row almost ends by printing predetermined lines through such a printing method, the state response signal is transmitted from the state response signal transmitting unit 25. The state response signal is a control signal which means that the printing of the first printing data normally ends and requests the transmission of the next second printing data to the host computer 12.

The state response signal which is transmitted from the state response signal transmitting unit 25 of the printer 11 is received by the data receiving unit 17 of the host computer 12. Then, when the state response signal decoding unit 18 detects that the printing is normally performed by the printer 11, the printing data of the next row generated by the printing data generating unit 13 and the state inquiry signal generated by the state inquiry signal generating unit 14 are transmitted to the data transmitting unit 15. Such data is transmitted from the data transmitting unit 15 of the host computer 12 to the printer 11.

Figure 2:
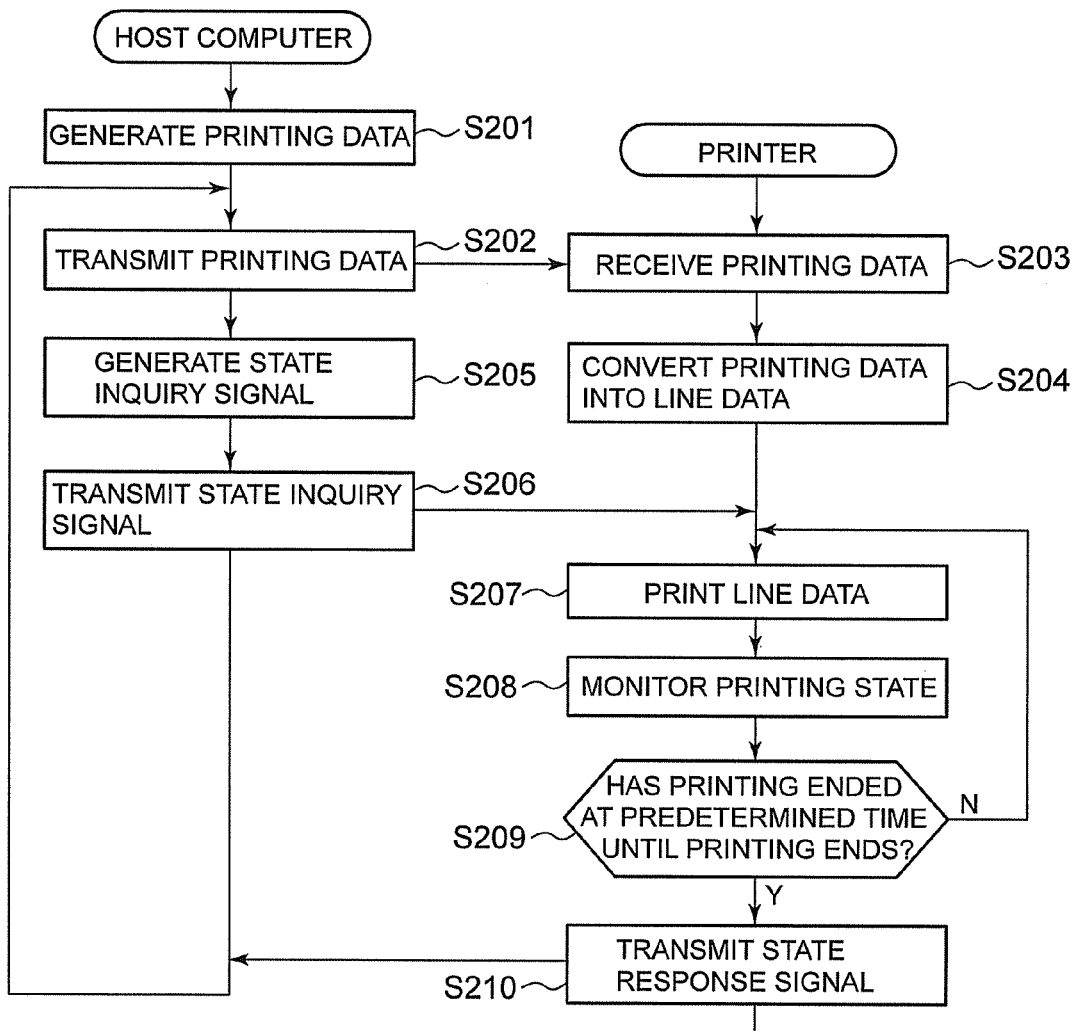
FIG. 2 is a flowchart illustrating an operation of the embodiment.

Next, an operation of the printer system 10 of the embodiment will be described according to the flowchart illustrated in FIG. 2. FIGS. 4A, 4B, 4C, and 4D are diagrams illustrating a timing of transmitting and receiving signals between the host computer and the printer compared to the case of the related art.

FIGS. 4A, 4B, 4C, and 4D are diagrams illustrating a timing comparison between the related art and the embodiment with regard to the printing data of the printer and the state inquiry signal to be subsequently transmitted in the host computer. The signal transmitting time between the host computer and the printer is not considered.

In the case of the related art, as illustrated in FIG. 4A, the host computer first transmits printing data CP1 at the time T1 and then transmits a state inquiry signal SQ1 at the time T3 to the printer. The printing data CP1 is data from the time T1 to the time T2, and the printer starts printing after receiving the printing data CP1. That is, when the printing data is converted into the line data and the printing for one row ends, the printer transmits the state where the printing of the printing data ends at the time T6 as state response signal SA1 to the host computer. The time PR1 is an actual printing time of the printing data. There is a time related to the control and the like with the start and the end of the printing before and after the time PR1.

The host computer transmits the printing data of the next row to the printer from the time T6 to the time T7. Thus, the printer obtains data for one row, converts the data into the line data, and then starts the printing of the data. In the case of the related art, the printer ends the printing for one row and then notifies the printing end state to the host computer.

FIGS. 4C and 4D illustrate a timing of transmitting and receiving signals between the host computer 12 and the printer 11 of the above-described embodiment. As indicated by step S201 of FIG. 2, printing data is generated by the printing data generating unit 13 of the host computer 12. Then, as illustrated in FIG. 4C, printing data DP1 is transmitted from the data transmitting unit 15 from the time T1 to the time T2 (step S202).

The printing data DP1 is completely received by the data receiving unit 19 of the printer 11 at the time T2. Furthermore, in FIG. 4, it is assumed that the signal transmission time between the host computer 12 and the printer 11 is zero.

As illustrated in FIG. 4D, the conversion of the printing data into the line data and the control thereof start at the time T2, and the printing of the line data starts. Specifically, the printing data which is received in step S203 is converted into the line data by the printing data converting unit 20 in step S204.

On the other hand, after the host computer 12 transmits the printing data to the printer 11 in step S202, the state inquiry signal generating unit 14 generates the state inquiry signal in step S205 and the data transmitting unit 15 transmits the generated state inquiry signal KQ1 in step S206.

The transmitted state inquiry signal KQ1 is received by the printer 11, and the data which is first converted into the line data is printed by the printing unit 22 in step S207. In step S208, the printing state monitoring unit 23 monitors the printing state.

The printing position detecting unit 24 is connected to the printing state monitoring unit 23. In step S209, the printing position detecting unit 24 detects whether the printing ends until the time point at which the printing is completed at a predetermined time before the printing ends. When it is detected that the printing normally ends at the position, the printing position detecting unit 24 transmits the state response signal SB1 representing such a state from the state response signal transmitting unit 25 to the host computer 12 (step S210). The state response signal SB1 is a control signal which represents that the printing up to a predetermined position normally ends and the printing for one row almost ends normally. The time point is a time T4 illustrated in FIGS. 4A, 4B, 4C, and 4D.

The state response signal decoding unit 18 proves that the printing data for one row is normally printed up to the predetermined position in the printer 11 through the data receiving unit 17 of the host computer 12. Then, the routine returns to step S202, and the printing data DP2 for next one row is transmitted to the printer 11.

The printing data DP2 is received by the printer 11, and through steps S203, S204, and S207 to S210, the conversion of the printing data into the line data, the printing, the monitoring of the printing state, and the detection of the printing up to the predetermined position are performed. Meanwhile, the host computer 12 generates a state inquiry signal KQ2 by the state inquiry signal generating unit 14, and transmits the state inquiry signal KQ2 in step S206. The state response signal SB2 is a response signal with respect to the state inquiry signal KQ2.

When the signal SB2 representing the state where the printing up to the predetermined position normally ends is transmitted from the printer 11, the next printing data DP3 is transmitted from the data transmitting unit 15 to the printer 11.

The state inquiry signal generating unit 14 generates a state inquiry signal KQ3 with respect to the printing data after a predetermined time elapses from the transmission of the printing data DP3, and the signal is transmitted from the data transmitting unit 15 of the host computer 12 (steps S205 and S206).

On the other hand, as in steps S203, S204, and S207 to S210, the printer 11 performs the receiving of the printing data, the conversion of the printing data into the line data, the printing of the line data, the monitoring of the printing state, and the detection of the printing up to a predetermined position. Then, in step S210, a signal SB3 which represents the state where the printing up to the predetermined position normally ends is transmitted as the response signal with respect to the state inquiry signal to the host computer 12. The printer system of the embodiment having the configuration illustrated in FIG. 1 is operated as below.

As described above, in the embodiment, as is obvious from the comparison with the case of the related art illustrated in FIGS. 4A, 4B, 4C, and 4D, the next printing data is transmitted from the host computer before the printing of the line data of the printing data for one row ends.

Accordingly, the printer 11 can continue the printing without pausing and resuming the printing.

Here, the time T4 when transmitting the next printing data from the host computer 12 will be described. The time T4 is a time which is ahead of the one-row printing end time by a predetermined time ($\Delta T$ illustrated in FIG. 4C). The time $\Delta T$ is a time from the time of transmitting the state response signal SB1 to the time at which the host computer receiving the signal generates or calls the next printing data and transmits the printing data to the printer so that the printer enters a printing start available mode. The time corresponds to a predetermined position.

In the above-described embodiment, a case has been described in which the state inquiry signal is transmitted subsequently after the printing data from the host computer to the printer. However, the printer may transmit the state response signal which represents the printing end state before a predetermined time at which the printing of the printing data ends without transmitting the state inquiry signal.

While some embodiments of the invention have been described, these embodiments are merely examples, and are not intended to limit the scope of the invention. These novel embodiments may be implemented in various other forms, and various omissions, replacements, and modifications may be made without departing from the scope of the invention. These embodiments and the modifications are included in the scope or the spirit of the invention, and are included in the scope of the invention of claims and the equivalents thereof.

What is claimed is:

1. A printer system comprising:
a host computer which transmits printing data; and
a printer which receives and prints the printing data transmitted from the host computer,
wherein second printing data following after first printing data is transmitted from the host computer to the printer at a time point after printing of the first printing data in the printer starts and before a predetermined time at which the printing of the first printing data in the printer ends.

2. The printer system according to claim 1,
wherein a state response signal representing a state where the printing of the first printing data normally ends is transmitted from the printer to the host computer at the time point before the predetermined time.

3. The printer system according to claim 2,
wherein the predetermined time is set to a time from the time point of transmitting the state response signal to a time point at which the printer receives the second printing data and starts printing of the second printing data.

4. The printer system according to claim 2,
wherein the printing data is converted into line data and is printed by the printer.

5. The printer system according to claim 1,
wherein the state response signal is transmitted from the printer to the host computer as a response for a state inquiry signal transmitted after the printing data transmitted from the host computer to the printer.

6. A printer system comprising:
a host computer which sequentially transmits first printing data and second printing data; and
a printer which receives and prints the first printing data and the second printing data transmitted from the host computer,
wherein the host computer includes a printing data generating unit which generates printing data, a data transmitting unit which transmits the printing data to the printer, and a data receiving unit which receives a state response signal representing a printing state from the printer, and
the printer includes a data receiving unit which receives the first printing data transmitted from the printing data generating unit, a printing unit which prints the first printing data received by the data receiving unit, a printing position detecting unit which detects a printing position in the printing unit, and a state response signal transmitting unit which transmits a state response signal representing a state where printing of the received first printing data normally ends to the data receiving unit of the host computer at a time point before a predetermined time at which the printing of the first printing data ends, in case the printing position detecting unit detects that the printing up to a predetermined position is normally performed.

7. The printer system according to claim 6,
wherein the predetermined time is set to the time from a time point of transmitting the state response signal to a time point at which the printer receives the second printing data and starts printing of the second printing data.

8. The printer system according to claim 7,
wherein the printing data is converted into line data and is printed by a printing unit of the printer.

9. A printer comprising:
a data receiving unit which receives first printing data transmitted from a host computer;
a printing unit which prints the printing data received by the data receiving unit;
a printing position detecting unit which detects a printing position in the printing unit; and
a state response signal transmitting unit which transmits a state response signal representing a state where printing of the received first printing data normally ends and transmission of next second printing data is requested to the host computer at a time point before a predetermined time at witch the printing of the first printing data ends, in case the printing position detecting unit detects that the printing up to a predetermined position is normally performed.

10. The printer according to claim 9,
wherein the predetermined time is set to a time from the time point of transmitting the state response signal to a time point at which the printer receives the second printing data and starts printing of the second printing data.

* * * * *